(12) United States Patent
Anno et al.

(10) Patent No.: US 6,891,586 B2
(45) Date of Patent: May 10, 2005

(54) LIQUID CRYSTAL DISPLAY DEVICE

(75) Inventors: Kouichi Anno, Mobara (JP); Tohru Sasaki, Mobara (JP)

(73) Assignee: Hitachi, Ltd., Tokyo (JP)

( * ) Notice: Subject to any disclaimer, the term of this patent is extended or adjusted under 35 U.S.C. 154(b) by 94 days.

(21) Appl. No.: 10/002,134

(22) Filed: Dec. 5, 2001

(65) Prior Publication Data

US 2002/0071083 A1 Jun. 13, 2002

(30) Foreign Application Priority Data

Dec. 7, 2000 (JP) ........................................ 2000-372786

(51) Int. Cl.[7] .......................................... G02F 1/1335
(52) U.S. Cl. ..................................................... 349/113
(58) Field of Search ........................... 349/113, 43, 143

(56) References Cited

U.S. PATENT DOCUMENTS

| | | | |
|---|---|---|---|
| 5,418,635 | A | 5/1995 | Mitsui et al. |
| 6,195,140 | B1 | 2/2001 | Kubo et al. |
| 6,330,047 | B1 | 12/2001 | Kubo et al. |
| 6,407,784 | B1 * | 6/2002 | Kanou et al. ............ 349/113 |
| 6,452,654 | B2 | 9/2002 | Kubo et al. |
| 6,522,375 | B1 * | 2/2003 | Jang et al. ............... 349/113 |

FOREIGN PATENT DOCUMENTS

| | | |
|---|---|---|
| JP | 5-232465 | 2/1992 |
| JP | 5-281533 | 4/1992 |
| JP | 6-27481 | 7/1992 |
| JP | 8-95071 | 9/1994 |
| JP | 10-10525 | 6/1996 |
| JP | 11-281972 | 3/1998 |
| JP | 11-337961 | 5/1998 |
| JP | 2000-180610 | 12/1998 |
| JP | 2000-98375 | 2/1999 |
| KR | 2000-0060263 | 3/1999 |

OTHER PUBLICATIONS

Pub. No. US 2003/0053016 A1, Kubota et al., Mar. 20, 2003.*

* cited by examiner

*Primary Examiner*—Robert H. Kim
*Assistant Examiner*—Thoi V. Duong
(74) *Attorney, Agent, or Firm*—Reed Smith LLP; Stanley P. Fisher, Esq.; Juan Carlos A. Marquez, Esq.

(57) ABSTRACT

To respective pixel regions formed on a liquid-crystal side of one of a pair of substrates which are arranged to face each other in an opposed manner while sandwiching liquid crystal therebetween, pixel electrodes which reflect an external light incident on the pixel electrodes through the other substrate are provided. Protruding portions are formed on a surface of the pixel electrode in a scattered manner and the protruding portions have two or more kinds of shapes which are different from each other when the pixel electrodes are viewed in a plan view. The protruding portions formed on the surface of the pixel electrode are formed of island-like multi-layered material layers which are positioned at lower layer sides of the pixel electrodes. Due to such a constitution, the generation of the interference light can be suppressed.

12 Claims, 6 Drawing Sheets

LIQUID CRYSTAL DISPLAY DEVICE

BACKGROUND OF THE INVENTION

1. Field of the Invention

The present invention relates to a liquid crystal display device, and more particularly, to a liquid crystal display device of a so-called reflection type which performs a display using a reflection light of an incident external light or of an active matrix type which combines a transmission type and a reflection type.

2. Description of the Related Art

In a liquid crystal display device of an active matrix type, regions which are surrounded by gate signal lines which are extended in the x direction and are arranged in parallel in the y direction and drain signal lines which are extended in the y direction and are arranged in the x direction in parallel on a liquid-crystal-side surface of one of respective substrates which are arranged in an opposed manner while inserting the liquid crystal therebetween are defined as pixel regions, wherein each pixel region is provided with a thin film transistor which is driven with the supply of scanning signals from the gate signal line at one side and a pixel electrode to which video signals from the drain signal line at one side are supplied through the thin film transistor.

These pixel electrodes generate an electric field having an intensity which corresponds to the video signals between the pixel electrodes and a counter electrode formed on a liquid-crystal-side surface of the other substrate so as to control the light transmittivity of the liquid crystal.

As one of these liquid crystal display devices, there has been known a so-called reflection-type liquid crystal display device in which pixel electrodes are constituted of material (for example, aluminum) which reflects an external light incident through the other substrate (the substrate positioned at a viewer's side).

Further, there has been also known a liquid crystal display device in which island-like material layers are positioned in a scattered manner at lower layer sides of pixel electrodes and protruding portions of the material layers are exposed on surfaces of the pixel electrodes so that the reflection characteristics which are uniform and exhibit the favorable light scattering property can be obtained (see Japanese Laid-open Patent Publication 98375/2000, Japanese Laid-open Patent Publication 337961/1999).

However, in the liquid crystal display devices having such constitutions, all of the island-like material layers which are formed at the lower layer sides of the pixel electrodes have the same shape (including the similar shape) when viewed in a plan view so that all of the side surfaces of the protrusions which are exposed from the surfaces of the pixel electrodes due to respective material layers have the same taper angle.

Accordingly, it has been pointed out that light beams which are reflected on the side surfaces of the protruding portions of the pixel electrodes interfere with each other so that the interference light generated by such an interference suppresses the enhancement of the display quality.

SUMMARY OF THE INVENTION

The present invention has been made in view of such circumstances and it is an object of the present invention to provide a liquid crystal display device which can suppress the generation of the interference light.

To briefly explain the summary of typical inventions among inventions disclosed in the present application, they are as follows.

The liquid crystal display device according to the present invention is, for example, characterized in that to respective liquid-crystal-side pixel regions of one of substrates which are arranged to face each other while inserting liquid crystal therebetween, pixel electrodes which reflect an external light incident through the other substrate are provided, and these pixel electrodes are formed such that protruding portions are scattered on surfaces thereof and respective protruding portions are provided in two or more kinds different in shape from each other when the pixel electrodes are viewed in a plan view.

In the liquid crystal display device having such a constitution, with respect to the protruding portions formed on the surfaces of the pixel electrodes, two or more kinds of protruding portions which are different in shape when the pixel electrodes are viewed in a plan view are present so that light beams which are reflected on side surfaces of the protruding portions of the pixel electrodes hardly interfere with each other. Accordingly, the display quality can be enhanced.

The protruding portions formed on the surfaces of the pixel electrodes are formed of island-like multi-layered material layers which are positioned at the lower layer sides of the pixel electrodes.

By changing the number of layers of the island-like multi-layered material layers, or by making the shape of one layer different from the shape of one layer of other island-like multi-layered material layers, or by offsetting the center position of the shape of one layer from the center position of the shape of the other layer, the respective protruding portions can be formed of two or more kinds which are different in shape when the pixel electrodes are viewed in a plan view.

Further, by forming the island-like multi-layered material layers using inorganic material which is identical with inorganic material used for other constituent elements which are positioned at a layer below the pixel electrodes, the protruding portions can be formed without increasing the number of manufacturing steps.

Further, a layer made of organic material or a sequential laminated body made of inorganic material and organic material may be formed between the pixel electrodes and the island-like multi-layered material layers.

DESCRIPTION OF THE PREFERRED EMBODIMENTS

Preferred embodiments of a liquid crystal display device according to a present invention are explained in conjunction with attached drawings hereinafter.

Embodiment 1

Figure 1:
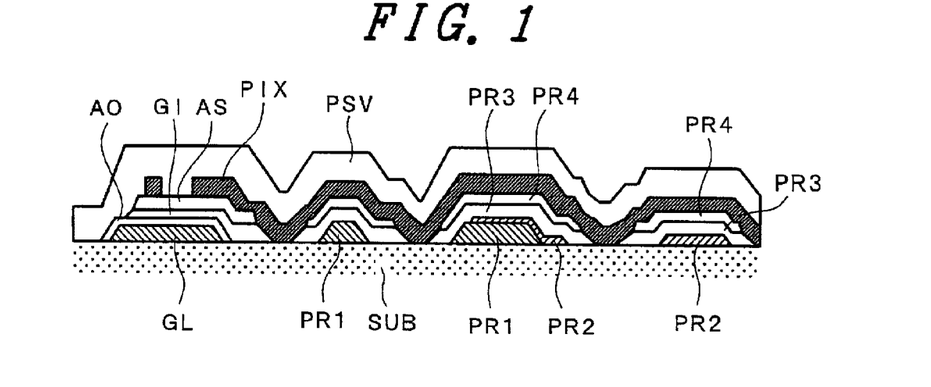
FIG. 1 is a view showing the constitution of an essential part of one embodiment of a liquid crystal display device according to the present invention and also is a cross-sectional view taken along a line I—I in FIG. 2.
Figure 2:
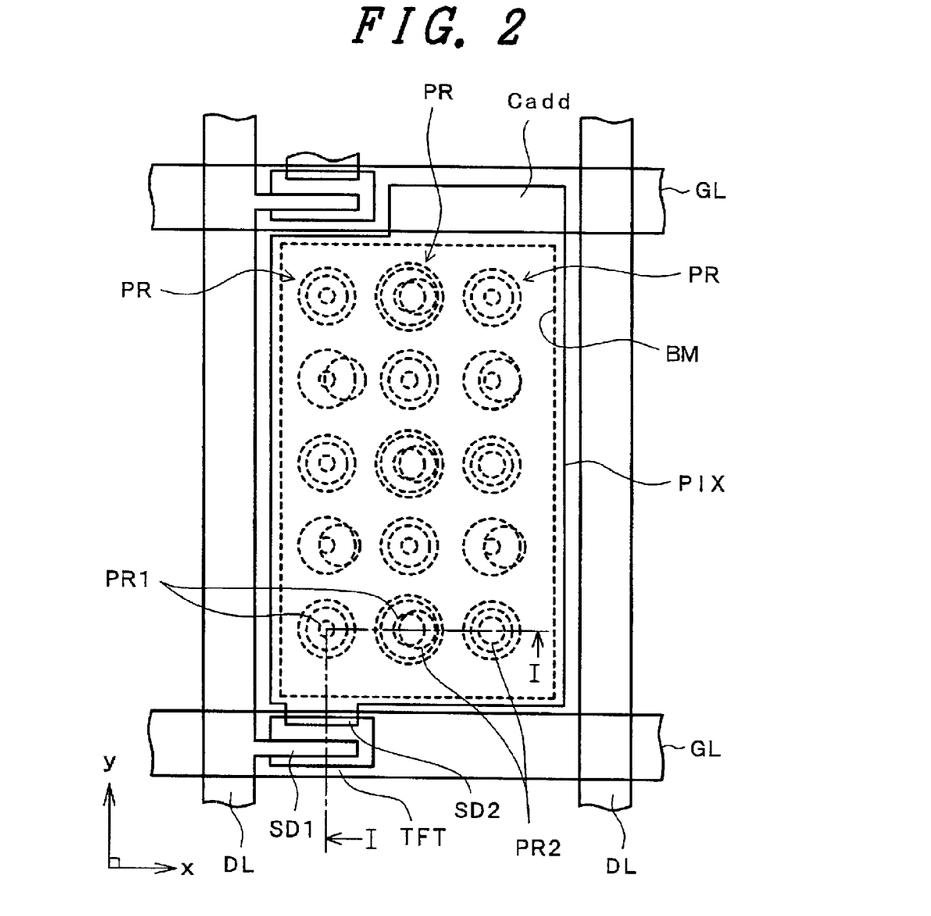
FIG. 2 is a plan view showing one embodiment of a pixel of the liquid crystal display device according to the present invention.

FIG. 2 is a plan view showing one embodiment of a pixel of a liquid crystal display device according to the present invention. Further, a cross-sectional view taken along a line I—I of FIG. 2 is shown in FIG. 1.

FIG. 2 shows one of a large number of pixels which are arranged in a matrix array and other pixels which are arranged at left and right sides and at upper and lower sides of the pixel have the similar constitution.

First of all, in FIG. 2, gate signal lines GL which are extended in the x direction and are arranged in parallel in the y direction are formed on a liquid-crystal-side surface of a transparent substrate SUB.

These gate signal lines GL are, for example, formed of aluminum (Al) and surfaces of the gate signal lines GL are subjected to the anodic oxidation thus forming oxide films AO of Al. These oxide films AO are formed to obviate a phenomenon that a hillock is generated due to a thermal treatment which is performed thereafter so that the gate signal lines GL are electrically short circuited with the drain signal lines DL, for example.

Within a pixel region which defines an area surrounded by a pair of neighboring gate signal lines GL and a pair of neighboring drain signal lines DL which will be explained later, several island-like Al layers are formed.

These Al layers are layers which form protruding portions PR within the pixel region by being laminated to other island-like material layers which will be explained later. In this embodiment, these Al layers are referred to as first protruding portions PR1. Further, the nth protruding portion PRn (n=1, 2, 3, . . . ) which will be explained later means one material layer of the protruding portion PR which is constituted of a laminated body.

The above-mentioned protruding portions PR formed within the pixel region are formed such that they are regularly arranged as shown in FIG. 2. However, it is not always necessary to form the Al layers which are constituted of the first protruding portions PR1 at all positions where these protruding portions PR are to be formed. That is, some protruding portions PR may be provided with the first protruding portions PR1 and the other protruding portions PR may be not provided with the first protruding portions PR1.

Further, the second protruding portions PR2 which are made of ITO (Indium-Tin-Oxide) films, for example, are formed such that they are superposed on some of the above-mentioned first protruding portions PR1. These second protruding portions PR2 are formed such that their centers are offset from the centers of the first protruding portions PR1 in this embodiment. Such a provision is made to make the shape of the protruding portions PR when viewed in a plan view different from the shape of other protruding portions PR as much as possible.

Accordingly, among places where the protruding portions PR are to be formed, there exist some places where the second protruding portions PR2 are formed but the first protruding portions PR1 are not formed.

Then, an insulation film GI which is made of SiN, for example, is formed on the transparent substrate SUB such that the insulation film GI also covers the gate signal lines GL, the first protruding portions PR1 and the second protruding portions PR2.

This insulation film GI functions as an interlayer insulation film between the gate signal lines GL and the drain signal DL with respect to the drain signal lines DL which will be explained later, functions as a gate insulation film with respect to a thin film transistor TFT which will be explained later, and functions as a dielectric film with respect to a capacitance element Cadd which will be explained later.

Accordingly, although the insulation film GI is usually formed over the whole regions of respective pixels, in this embodiment, the insulation film GI is selectively formed over regions where the protruding portions PR are formed within the pixel regions and portions surrounding the protruding portions are etched (See FIG. 1). This constitution is provided for using the insulation film GI as the portions of the protruding portions PR, that is, as the third protruding portions PR3 in respective protruding portions PR formed within the pixel region.

Above the insulation film GI which is superposed on the gate signal line GL at the left lower portion of the pixel region, a semiconductor layer AS of i type (intrinsic: doped with no conductive determining impurities) which is made of a-Si is formed.

This semiconductor layer AS constitutes a semiconductor layer of a MIS type thin film transistor TFT which uses a portion of the gate signal line GL as a gate electrode by laminating a source electrode and a drain electrode thereon.

Here, this semiconductor layer AS is also selectively formed at regions where the protruding portions PR are formed in the pixel region (see FIG. 1) in this embodiment. This provision is made to constitute the semiconductor layer AS as the fourth protruding portion PR4 in each protruding portion PR in the same manner as the insulation film GI.

The source electrode SD1 and the drain electrode SD2 of the thin film transistor TFT are formed simultaneously with the drain signal line DL which is formed on the insulation film GI.

That is, the drain signal lines DL which are extended in the y direction and are arranged in parallel in the x direction are formed and portions of the drain signal lines DL are extended over the upper portion of the semiconductor layer AS such that the extended portions constitute drain electrodes SD1 of the thin film transistors TFT.

On the other hand, the source electrode SD2 is configured to be integrally formed with the pixel electrode PIX which is formed over the substantial area within the pixel region.

The drain signal lines DL (drain electrodes) and the pixel electrode PIX (source electrodes) are both formed of the same material layer. In this embodiment, the drain signal lines DL and the pixcel electrode PIX are formed of a sequential laminated body consisting of chromium (Cr) and aluminum (Al). Chromium is used as the lower layer by taking the connection between the lower layer and the semiconductor layer AS into consideration and aluminum is used as the upper layer by taking the reflection efficiency of the pixel electrode PIX which is made to function as a reflection electrode.

Then, on the surface of the pixel electrode PIX formed in the above-mentioned manner, the shape of the protruding portions PR appears clearly while maintaining the exact shapes thereof. Among these protruding portions PR, there are some protruding portions PR which are different in the number of layers or the protruding portions PR which are different in the shape in a plan view. Due to such a constitution, the directions of the reflection lights become random and there is no case that the reflection lights interfere with each other. Accordingly, an advantageous effect that the display quality can be enhanced is obtained.

A semiconductor layer doped with impurities is formed on interfaces defined between the drain electrode SD2, the source electrode SD1 and the semiconductor layer AS. This semiconductor layer is configured to function as a contact layer.

After forming the semiconductor layer AS, a semiconductor layer having a thin film thickness which is doped with impurities is formed on the semiconductor layer AS. Then, after forming the drain electrode SD2 and the source electrode SD1, a portion of the semiconductor layer doped with impurities which is exposed from the respective electrodes SD2, SD1 is etched using respective electrodes as masks whereby the above-mentioned constitution can be obtained.

In this manner, on the surface of the transparent substrate SUB on which the drain signal lines DL, the pixel electrodes PIX and the like are formed, a protective film PSV which is made of SiN, for example, and covers also the drain signal lines DL and the like is formed. The protective film PSV is provided so as to avoid the direct contact between the thin film transistor TFT and the liquid crystal and for other purposes.

Although not shown in the drawing, on a liquid-crystal-side surface of a transparent substrate which is arranged to face the transparent substrate SUB while sandwiching the liquid crystal therebetween, a black matrix (indicated by a dotted-line frame BM in FIG. 2) is formed such that the black matrix defines respective pixel electrodes.

The black matrix BM is served for preventing the external light from being irradiated to the thin film transistor TFT and for enhancing the display contrast.

Further, color filters having colors corresponding to respective pixel regions are formed in aperture portions (constituting regions which allow light to pass therethrough and forming substantial pixel regions) of the black matrix BM.

These color filters are used such that, for example, the filters of same color are used in respective pixel regions arranged in parallel in the y direction and the filters of red (R), green (G), blue (B), for example, are sequentially repeated for respective pixel regions in the x direction.

One example of a method for manufacturing the liquid crystal display device having such a constitution is explained hereinafter in conjunction with FIG. 3A to FIG. 3E.

Figure 3A:
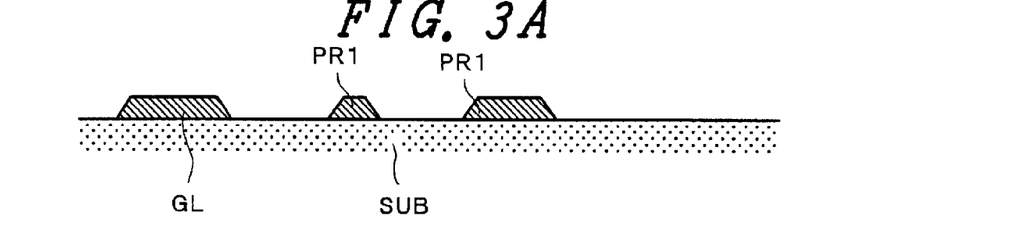
FIG. 3A to FIG. 3E are step views showing one embodiment of a manufacturing method of the liquid crystal display device according to the present invention.

Step 1. (FIG. 3A)

First of all, an Al layer having a thickness of approximately 300 nm is formed on the transparent substrate SUB using a sputtering method. A mask pattern made of a photoresist resin film is formed on the Al layer using a photolithography technique (referred to as "photo step hereinafter).

After selectively etching the Al layer using a mixed solution of phosphoric acid, hydrochloric acid and nitric acid, the photo resist resin film is peeled off.

Using the pattern of the remaining Al layer obtained by such a treatment, the gate signal lines GL and a plurality of scattered first protruding portions PR1 which appear clearly on the surface of the pixel electrode are formed.

Figure 3B:
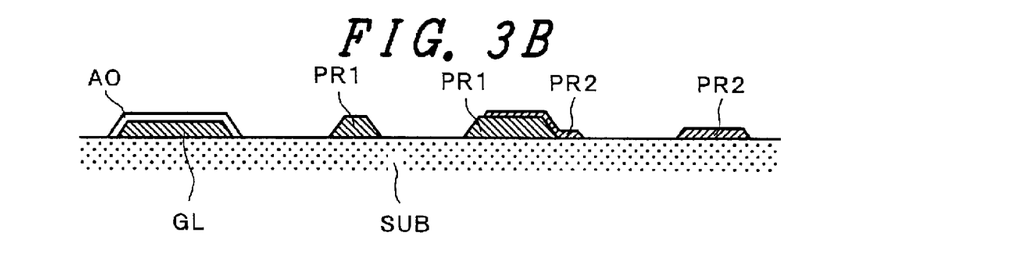

Step 2. (FIG. 3B)

The patterned surface of the Al layer is subjected to the anodic oxidation in a tartaric acid solution thus forming an anodic oxygen film AO having a thickness of approximately 180 nm.

Thereafter, on the surface of the transparent substrate SUB, the ITO (Indium-Tin-Oxide) film having a thickness of approximately 100 nm is formed by a sputtering method, for example. Then, the ITO film is selectively etched using an aqua regia solution after a photo step.

The remaining ITO film constitutes the second protruding portions PR2 on some of the first protruding portions PR1 or constitutes the second protruding portions PR2 at portions where the first protruding portions PR1 are not formed.

Figure 3C:
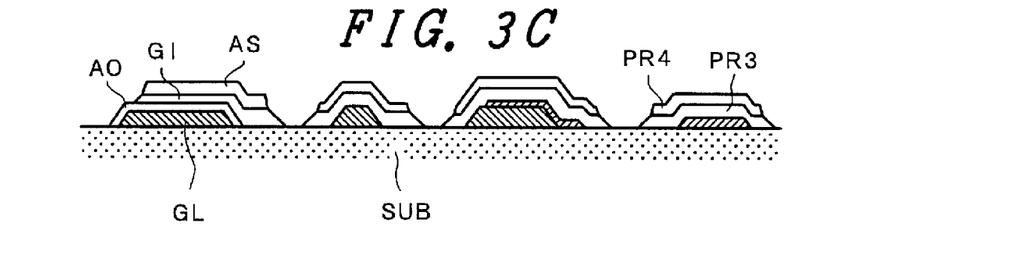

Step 3. (FIG. 3C)

On the surface of the transparent substrate SUB, the silicon nitride film SiN having a thickness of approximately 240 nm is stacked using a CVD method, for example. This silicon nitride film SiN constitutes the insulation film GI.

Subsequently, after stacking an amorphous silicon layer having a thickness of approximately 200 nm on the transparent substrate SUB using a CVD method, an n(+) amorphous silicon layer doped with approximately 1% of phosphate (P) and having a thickness of approximately 35 nm is stacked. A sequential laminated body made of the amorphous silicon layer and the n(+) amorphous silicon layer constitutes the semiconductor layer AS.

After a photo step, the semiconductor layer AS and the insulation film GI are unitarily subjected to a dry etching using a 6 fluoric sulfur gas.

In this case, since the etching speed of the semiconductor layer AS which constitutes the upper layer is faster than the etching speed of the insulation film GI which constitutes the lower layer, the end portion of the insulation film GI assumes a normal taper angle of approximately 4°, while the end portion of the semiconductor layer AS assumes a normal taper angle of approximately 70°.

In the dry selecting etching of the semiconductor layer AS and the insulation film GI which are performed through the photo steps, the third protruding portions PR3 and the fourth protruding portions PR4 each of which is formed of a laminated body of the insulation film GI and the semiconductor layer AS are formed on the first protruding portions PR1 (or the second protruding portions PR2) in a superposed manner.

In the drawing, although the third protruding portions PR3 and the fourth protruding portions PR4 are formed such that they are superposed on all of the first protruding portions PR1 (or the second protruding portions PR2), the present invention is not limited to such a constitution. That is, the third protruding portions PR3 and the fourth protruding portions PR4 are formed such that they are superposed on some selected first protruding portions PR1 (or some selected second protruding portions PR2).

Figure 3D:
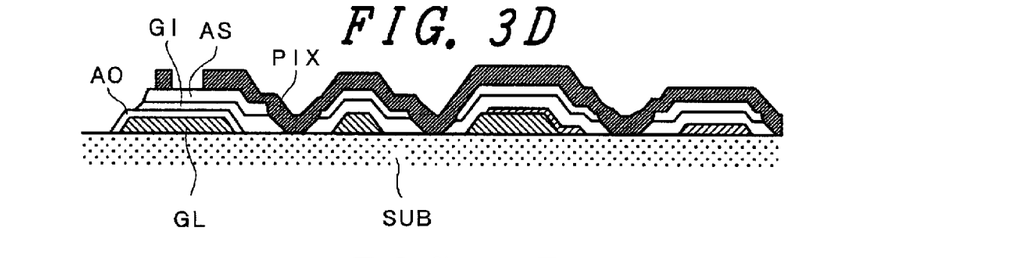

Step 4. (FIG. 3D)

On the surface of the transparent substrate SUB, chromium (Cr) having a thickness of approximately 30 nm, for example, is stacked using a sputtering method, for example and aluminum (Al) having a thickness of approximately 200 nm is further stacked. A laminated body made of these Cr and Al constitutes either the drain signal lines DL (drain electrode SD1, source electrode SD2 of thin film transistor TFT) or the pixel electrodes PIX.

After a photo step, Al is selectively etched using a mixed solution consisting of phosphoric acid, hydrochloric acid and nitric acid, while Cr is selectively etched using a cerium nitrate second ammonia solution.

The n(+) amorphous silicon layer which is exposed from the drain electrode SD1 and the source electrode SD2 on the semiconductor layer AS is removed by a dry etching using a 6 fluoric sulfur gas.

Figure 3E:
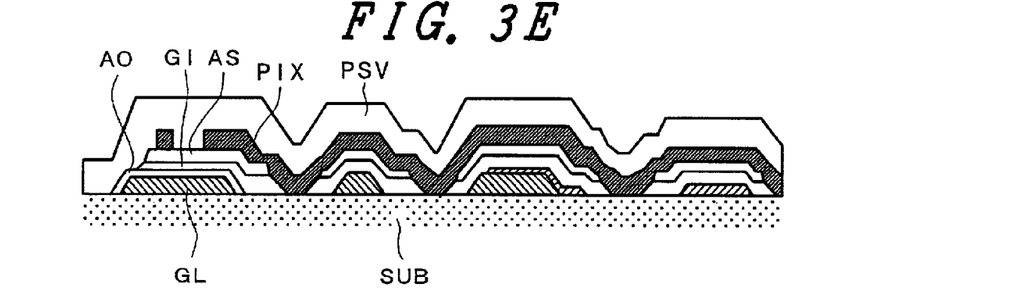

Step 5. (FIG. 3E)

On the transparent glass substrate SUB, silicon nitride (SiN) having a thickness of approximately 300 nm, for example, is stacked using a CVD method, for example. This SiN film constitutes the protective film PSV.

After a photo step, the patterning is performed by a dry etching using a 6 fluoric sulfur gas. Although not shown in the drawing, the patterning is performed for forming openings to expose terminals of the gate signal lines GL or terminals of the drain signal lines DL outside a region of the display portion which is formed of a mass of pixel regions.

Embodiment 2

Figure 4:
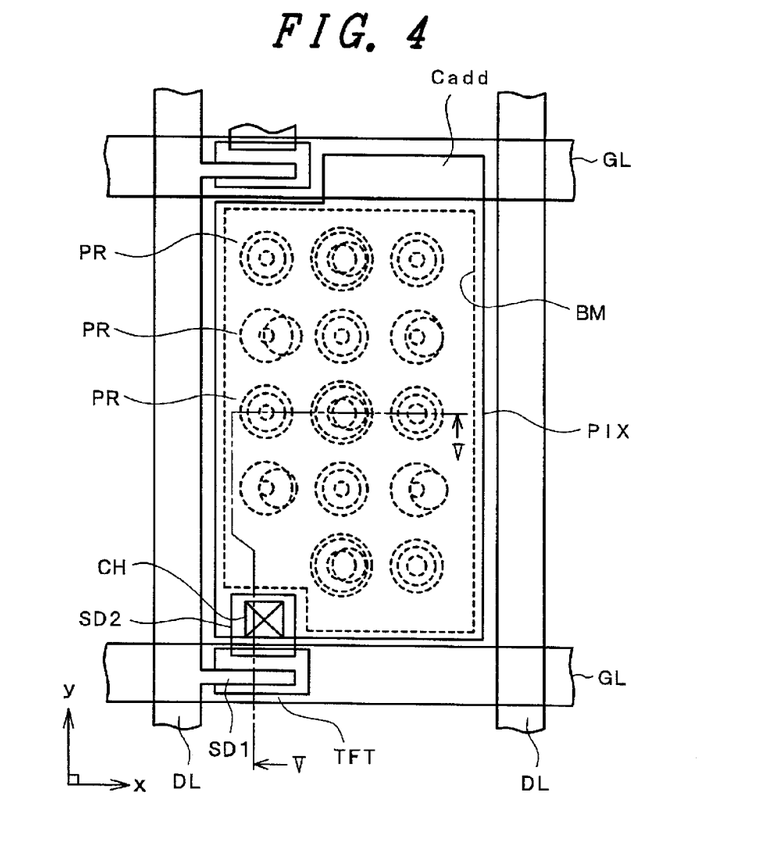
FIG. 4 is a plan view showing another embodiment of the pixel of the liquid crystal display device according to the present invention.
Figure 5:
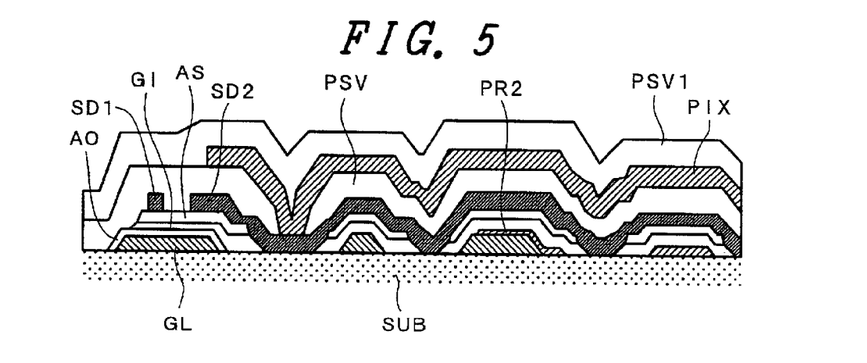
FIG. 5 is a cross-sectional view taken along a line V—V of FIG. 4.

FIG. 4 is a plan view showing other embodiment of the pixel of the liquid crystal display device according to the present invention and constitutes a view which corresponds to FIG. 2. FIG. 5 is a cross-sectional view taken along a line V—V of FIG. 4.

The constitution which differs from the constitution shown in FIG. 2 lies in that a source electrode SD2 (same goes for a drain electrode SD1, a drain signal line DL) of a thin film transistor TFT and a pixel electrode PIX are positioned at different layers through a protective film PSV, and the pixel electrode PIX is connected to the source electrode SD2 through a contact hole CH formed in the protective film PSV.

Even in such a constitution, a large number of protruding portions PR which differ in a planar shape are formed at a lower layer side of the pixel electrode PIX and the protruding portions PR appear clearly on the surface of the pixel electrode PIX.

Figure 6A:
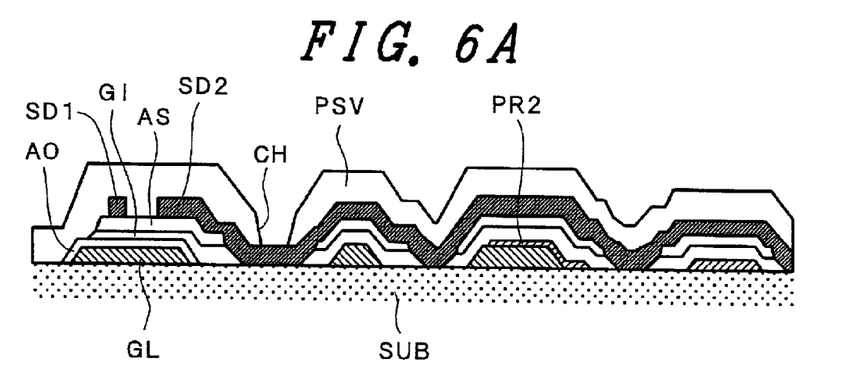
FIG. 6A to FIG. 6C are step views showing another embodiment of the manufacturing method of the liquid crystal display device according to the present invention.
Figure 6B:
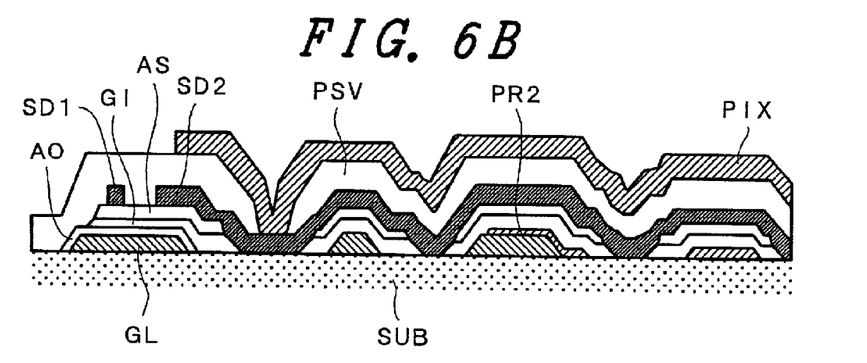
Figure 6C:
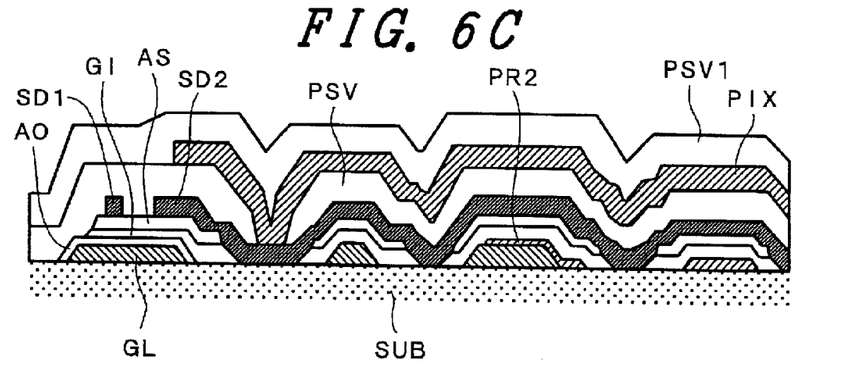

Hereinafter, one embodiment of method for manufacturing a liquid crystal display device having such a constitution is explained in conjunction with FIG. 6A to FIG. 6C. Since this manufacturing method is identical with the manufacturing method of the embodiment 1 with respect to steps shown in FIG. 3A to FIG. 3E, the following explanation is made with respect to subsequent steps which follow these steps shown in FIG. 3A to FIG. 3E.

Step 6. (FIG. 6A)

On the protective film PSV formed on a surface of a transparent substrate SUB, after a photo step, a portion of an extension of the source electrode SD2 is exposed thus forming the contact hole CH.

Step 7. (FIG. 6B) On the surface of the transparent substrate SUB, chromium (Cr) having a thickness of approximately 30 nm is stacked using a sputtering method, for example, and aluminum (Al) having a thickness of approximately 200 nm is further stacked. A laminated body made of these Cr and Al constitutes the pixel electrode PIX.

After the photo step, Al is selectively etched using a mixed solution consisting of phosphoric acid, hydrochloric acid and nitric acid, while Cr is selectively etched using a cerium nitrate second ammonia solution.

Here, by forming the pixel electrode PIX on an upper surface of the protective film PSV in the step 7, the sequential laminated body made of chromium and aluminum which is formed in the embodiment 1 spoils the function thereof as the pixel electrode.

Although there arises no drawback with respect to the liquid crystal display device even when the laminated bodies remain as it is, the laminated bodies may be selectively formed like islands in the region where the protruding portions PR are formed.

Figure 7:
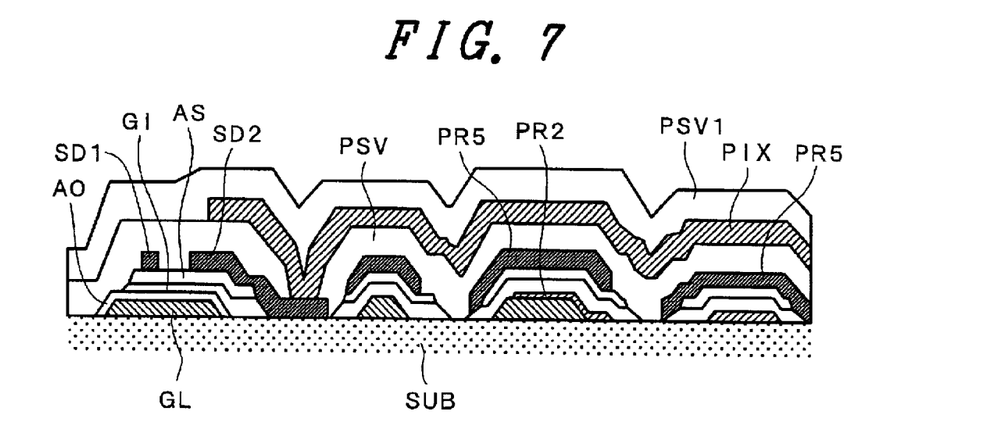
FIG. 7 is a cross-sectional view of an essential part showing another embodiment of the liquid crystal display device according to the present invention.

That is, at the time of forming the drain signal lines DL (drain electrodes SD1) and the source electrodes, by forming fifth protruding portions PR5 using the metal layers (sequential laminated bodies made of Cr and Al), it becomes possible to change the shape of the protruding portions PR. FIG. 7 is a constitutional view of such a case.

Step 8. (FIG. 6C) On the surface of the transparent glass substrate SUB, a silicon nitride film having a thickness of approximately 300 nm is stacked using a CVD method, for example. This SiN film constitutes a protective film PSV1.

After a photo step, a patterning is performed by a dry etching using a 6 fluoric sulfur gas. Although not shown in the drawing, the patterning is performed for forming openings to expose terminals of the gate signal lines GL or terminals of the drain signal lines DL outside a region of the display portion which is formed of a mass of pixel regions.

As mentioned above, respective protruding portions PR which are positioned at the lower layer of the pixel electrode PIX are constituted such that at least two kinds of protruding portions PR are included in the pixel electrode PIX when the pixel electrode PIX is viewed in a plan view.

Figure 8A:
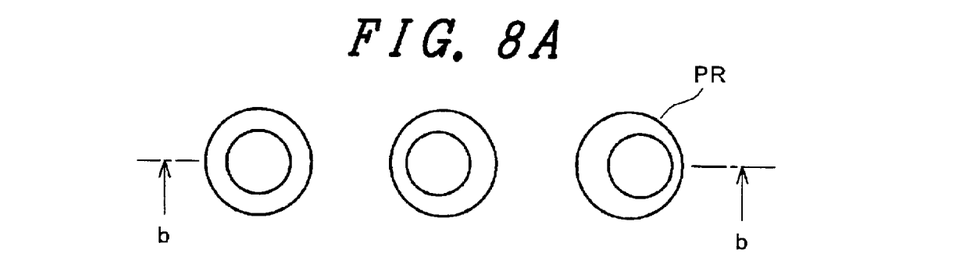
FIG. 8A is an explanatory view showing another embodiment of the liquid crystal display device according to the present invention and FIG. 8B is a cross-sectional view taken along a line b—b of FIG. 8A.
Figure 8B:
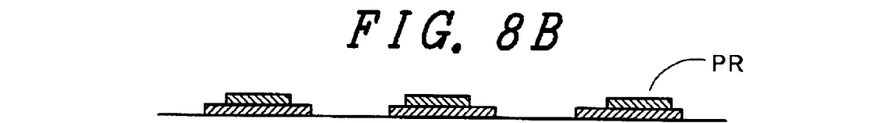
Figure 9A:
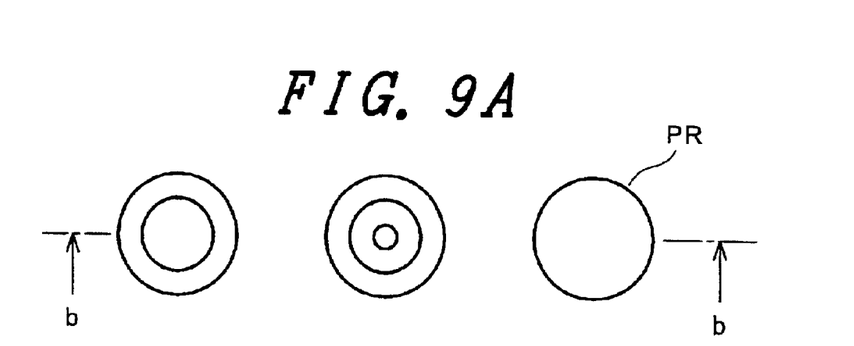
FIG. 9A is an explanatory view showing another embodiment of the liquid crystal display device according to the present invention and FIG. 9B is a cross-sectional view taken along a line b—b of FIG. 9A.
Figure 9B:
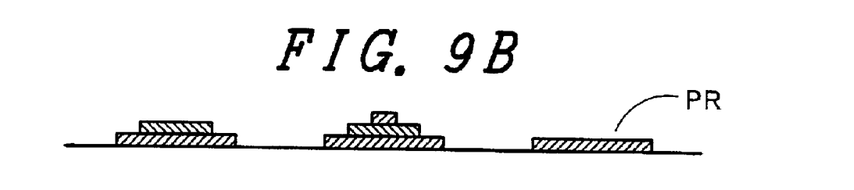
Figure 10A:
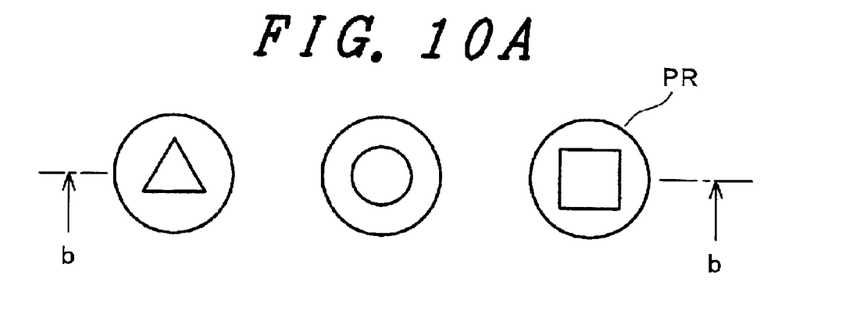
FIG. 10A is an explanatory view showing another embodiment of the liquid crystal display device according to the present invention and FIG. 10B is a cross-sectional view taken along a line b—b of FIG. 10A.
Figure 10B:
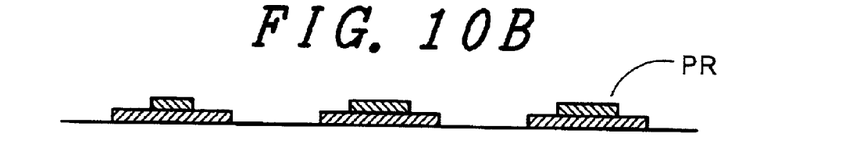

Here, respective configurations of the protrusions which differ in shape are explained using FIG. 8A, FIG. 8B, FIG. 9A, FIG. 9B, FIG. 10A and FIG. 10B. Respective drawings show the shapes of three protruding portions PR which, for example, constitute three neighboring protruding portions PR selected from a large number of scattered protruding portions PR. In these drawings, FIG. 8A, FIG. 9A and FIG. 10A are plan views and FIG. 8B, FIG. 9B and FIG. 10B are cross-sectional views taken along lines b—b in FIG. 8A, FIG. 9A and FIG. 10A.

Further, although the protruding portions PR are mainly formed of materials having a circular shape, it is needless to say that the shape of the protruding portions PR is not limited to such a shape and may be a rectangular shape, a polygonal shape or other peculiar shape.

With respect to these drawings, in FIG. 8A and FIG. 8B, each protruding portion PR is formed of a material layer which is constituted of two layers, wherein both of the first-layer protruding portion and the second-layer protruding portion have the circular shape.

Here, the second-layer protruding portion is arranged such that the portion has the center thereof offset from the center of the first-layer protruding portion.

Due to such a constitution, when the respective protruding portions are compared to each other, taper angles formed at side walls of the protruding portions differ from each other. Further, even when the taper angles are same, the second-layer protruding portions are arranged such that they are disposed in the different directions.

Further, in FIG. 9A and FIG. 9B, respective protruding portions PR consist of protruding portions which are respectively formed of a single-layered material, a two-layered material and a three-layered material. These protruding portions are arranged in a mixed array.

Even with such a constitution, when respective protruding portions are compared to each other, taper angles provided to respective side walls can be made different from each other.

Further, in FIG. 10A and FIG. 10B, respective protruding portions PR are formed of two-layered material layers and the materials which constitute the second layers have different shapes from each other.

Even with such a constitution, when respective protruding portions are compared to each other, taper angles provided to respective side walls can be made different from each other.

In performing the present invention, it is needless to say that the above-mentioned respective basic constitutions are combined.

In the above-mentioned embodiment, although the protective film PSV which is formed as the lower layer on the pixel electrode PIX is formed of the inorganic film such as SiN or the like, the protective film PSV may be formed of an organic film such as a resin film or may be formed of a sequential laminated body made of an inorganic film and an organic film. Then, when the protective films PSV are formed as island-like material layers at the protruding portions PR, since the top portions of the protruding portions PR have a smooth shape, the light which reflects on the surface of the pixel electrode PIX on which the protruding portions appear clearly scatters in many directions and hence, an advantageous effect that the diffusion ability is enhanced can be obtained.

Although the protective film PSV is formed on the pixel electrodes PIX in the display region in the embodiment 1 and the protective film PSV1 is formed on the pixel electrodes PIX in the display region in the embodiment 2, the same advantageous effect can be obtained even when the protective film PSV is arranged to coat at least the TFT portion.

In the liquid crystal display devices described in respective embodiments, each pixel forms the pixel electrode made of the reflection electrode in the whole region thereof. However, it is needless to say that the present invention is applicable to a liquid crystal display device which has both functions of a so-called transmission type liquid crystal display device and a so-called reflection type liquid crystal display device in which a pixel electrode made of a transparent electrode is formed on an approximately half region of each pixel and a pixel electrode made of a reflection electrode is formed in a remaining half region of the pixel.

As can be clearly understood from the above description, according to the liquid crystal display device of the present invention, the generation of the interference light can be suppressed efficiently.

What is claimed is:

1. A liquid crystal display device being characterized in that the liquid crystal display device has a pair of substrates which are arranged to face each other while inserting liquid crystal therebetween,
    to respective liquid-crystal side pixel regions formed on one of the substrates, pixel electrodes which reflect an external light incident through the other substrate are provided,
    the pixel electrodes are formed such that protruding portions are scattered on surfaces thereof and respective protruding portions are provided in two or more kinds which are different in shape from each other when the pixel electrodes are viewed in a plan view, and
    the protruding portions formed on the surfaces of the pixel electrodes are formed of island-like multi-layered material layers which are positioned at the lower layer sides of the pixel electrodes,
    wherein in each island like multi-layered material layer the center position of the shape of one layer is offset from the center position of the shape of other layer.

2. A liquid crystal display device according to claim 1, wherein among the island-like multi-layered material layers, there exist layers which are different in the number of layers.

3. A liquid crystal display device according to claim 1, wherein among the island-like multi-layered material layers, there exist the island-like multi-layered material layers whose shape of one layer is different from corresponding one layer of other island-like multi-layered material layers when the island-like multi-layered material layers are viewed in a plan view.

4. A liquid crystal display device according to claim 1, wherein among the respective island-like multi-layered material layers, there exist multi-layered material layers whose taper angles provided to the side walls thereof are different from each other.

5. A liquid crystal display device according to claim 1, wherein the liquid crystal display device further includes a plurality of gate signal lines which are formed on the liquid-crystal-side of one substrate, and
    a plurality of drain signal lines are formed on the liquid-crystal-side surface of one substrate such that the drain signal lines intersect the gate signal lines,
    the pixel regions are regions which are surrounded by the gate signal lines which are arranged close to each other and the drain signal lines which are arranged close to each other,
    the pixel regions are provided with thin film transistors which are driven with the supply of scanning signals from the gate signal lines at one side, and
    the pixel electrodes receive video signals from the drain signal lines at one side through thin film transistors.

6. A liquid crystal display device according to claim 5, wherein each pixel electrode is formed on the whole of each pixel region.

7. A liquid crystal display device according to claim 5, wherein each pixel electrode is formed on a portion of each pixel region.

8. A liquid crystal display device according to claim 1, wherein the liquid crystal display device further includes
    a plurality of gate signal lines which are formed on the liquid-crystal-side surface of one substrate, and
    a plurality of drain signal lines which are formed on the liquid-crystal-side surface of one substrate such that the drain signal lines intersect the gate signal lines,
    the pixel regions are regions which are surrounded by the gate signal lines which are arranged close to each other and the drain signal lines which are arranged close to each other,
    the pixel regions are provided with thin film transistors which are driven with the supply of scanning signals from the gate signal lines at one side,
    the pixel electrodes receive video signals from the drain signal lines at one side through thin film transistors, and
    the island-like multi-layered material layer is formed of a laminated body made of at least two material layers selected from a material layer which is made of material equal to material of the gate signal lines, a material layer which is made of material equal to material of gate insulation films of thin film transistors, a material layer which is made of material equal to material of the drain signal lines, a material layer which is made of material equal to material of a protective film which covers the thin film transistors.

9. A liquid crystal display device according to claim 8, wherein the protective film includes organic material or a sequentially laminated body made of inorganic material and organic material.

10. A liquid crystal display device according to claim 1, wherein the island-like multi-layered material layers are formed of inorganic material.

11. A liquid crystal display device according to claim 1, wherein the island-like multi-layered material layers are formed of inorganic material which is identical with material of other constituent elements positioned as layers below the pixel electrodes.

12. A liquid crystal display device according to claim 1, wherein an organic material layer or a sequentially laminated body made of inorganic material and organic material is inserted between the pixel electrode and the island-like multi-layer material layer.

* * * * *